Jan. 8, 1935. E. KOENIG 1,987,013
AUTOMOBILE SIGNAL LAMP
Filed July 30, 1930 2 Sheets-Sheet 2

Inventor
E. Koenig
By Clarence A. O'Brien
Attorney

Patented Jan. 8, 1935

1,987,013

UNITED STATES PATENT OFFICE 1,987,013

AUTOMOBILE SIGNAL LAMP

Ernest Koenig, Buffalo, N. Y.

Application July 30, 1930, Serial No. 471,773

1 Claim. (Cl. 177—329)

My invention relates generally to electric lamps, and particularly to electric signal lamps adapted to be mounted on different parts of an automobile body such as on the fenders, and an important object of my invention is to provide an electric lamp of this character the energization of which is adapted to be controlled by means which are operative upon the turning of the automobile to one side or the other.

Another important object of my invention is to provide a simply constructed and rugged lamp of the character described which may be readily installed in any of a variety of places on the automobile and be highly visible and whose signal will be clearly understood.

Another important object of my invention is to provide an energizing switch in a signal lamp of the character described which is completely enclosed within a part of the lamp and which is operable by a cable leading to a part of the steering gear of the automobile which moves whenever the automobile is turned toward one side or the other or from one side or the other toward a straight ahead course.

Another important object of the invention is to provide for separably connecting two sections of the globe part of the lamp in such a way that moisture is excluded from the interior of the globe, despite the fact that no supplementary gaskets or packings are utilized in the joint.

Other objects and advantages of my invention will be apparent from a reading of the following description in connection with the drawings wherein for purposes of illustration I have shown a preferred embodiment of my invention.

In the drawings:—

Figure 1:
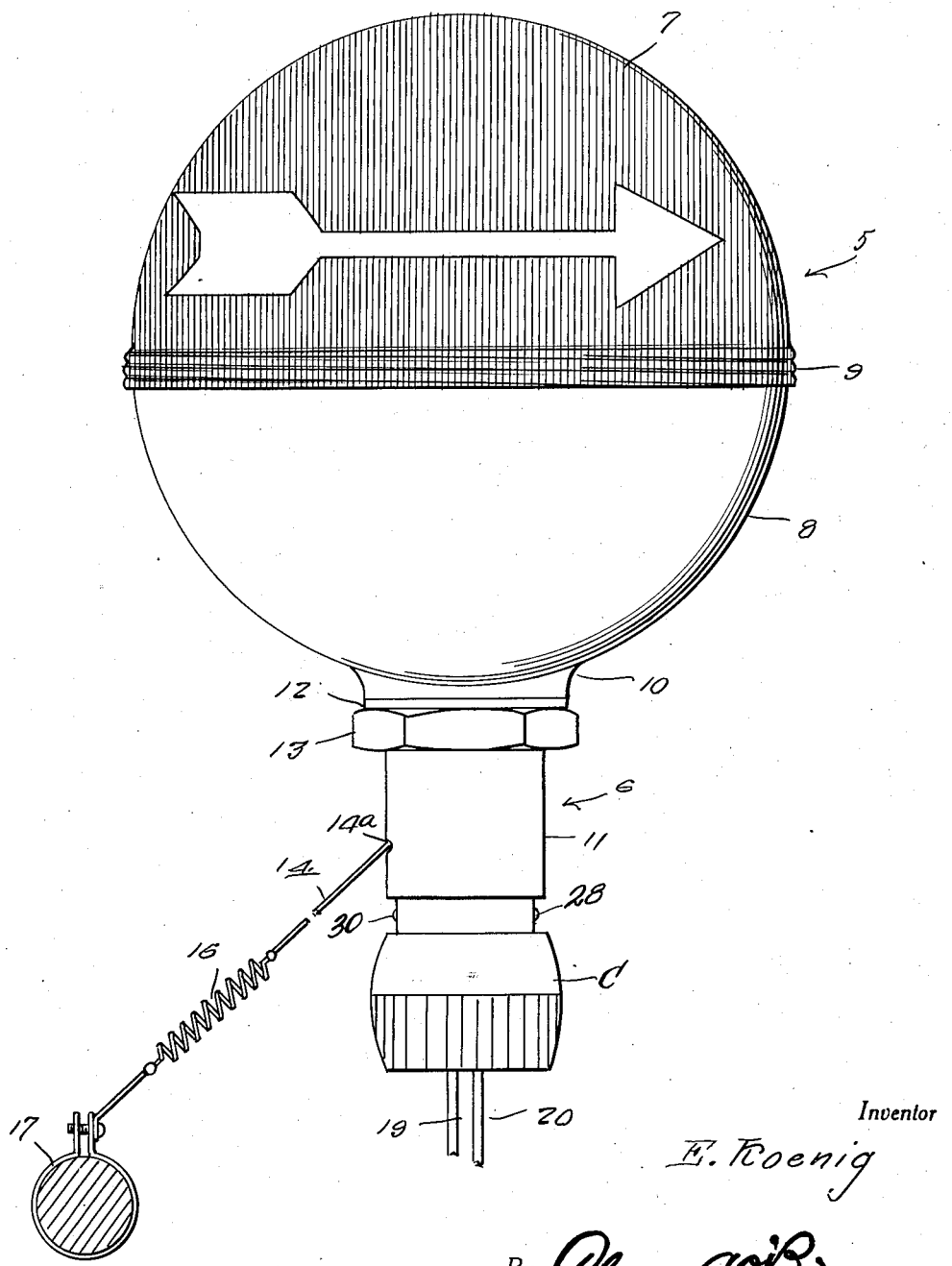
Figure 1 is a side elevational view of the embodiment, showing the switch operating cable connected to the tie rod of an automobile steering gear.

Referring in detail to the drawings, wherein like numerals refer to like parts throughout the same, the numeral 5 refers generally to the globe part of the embodiment which is shown in a form especially suitable for mounting on a fender, cowl, or other sheet metal part of the automobile, although it is not restricted to such location. The numeral 6 refers generally to the base part of the lamp which contains the switch and is arranged to pass through an opening in and will usually be located below or at the back of the sheet metal part on which the lamp is mounted, so as to support the globe part 5 at the upper or front side.

The globe part 5 is composed of the glass or other similar translucent or transparent upper hollow hemisphere 7 and the opaque, preferably metallic, lower hollow hemisphere 8 which is rigidly connected to the base part 6. The upper and lower hemispheres are separably connected together in such a way that water and moisture in the form of driving rain or melting snow will be positively excluded from the interior of the globe part, despite the absence of any packing or a gasket in the joint. There are many examples in the prior art of connections of this general type wherein the upper section of the globe is set into the lower section of the globe and a packing or gasket used to make the joint waterproof. It is a part of common knowledge that where this type of connection is used the cooperating parts must be either extremely carefully manufactured and fitted or some means provided for compressing one of the parts closely upon the other to achieve the necessary moisture excluding contact of the parts; and that a moisture proof joint secured in either of these ways is not only subject to deterioration but is subject to become inseparable because of corrosion, rust, etc. which develops therein due to slight seepage of moisture. It is obvious that presently known materials which are suitable for gaskets and packings for joints of this type deteriorate when contacted by the moisture and other elements, and eventually fail to perform not only the moisture excluding office but cause sticking and warping and partial separation of the joint.

I have discovered that by setting the lower globe part into the upper globe part and telescoping them for some distance, the seepage of moisture found unavoidable in the type of prior joints described because of the exposure of the space between the parts to driving rain and other moisture, is entirely prevented. This is due to the fact that the lower end of the upper globe part overhangs and surrounds the upper end of the lower globe part in such a way that any rain or falling water such as would result from snow on the globe melting, which may strike or flow downwardly or sidewise on or against the globe, will be positively directed outwardly of the sides of the lower globe part and shedded to a point considerably below the upper end of the lower part. The upper end of the lower globe part being above the lower end of the upper globe part there is no possibility of water reaching into the joint unless the water be forced upwardly directly thereat, a circumstance which will not ordinarily occur.

In order to provide a simple yet rugged and efficient joining of the upper and lower globe parts in the manner indicated above and to increase further the shedding activity of the lower end portion of the upper globe part, I have constructed the lower globe part with an exterior screw thread near its upper end to be received into a radially outwardly outset interiorly screw threaded annular portion 9 on the lower end of the upper globe section. It will be obvious that water flowing down the outside of the upper globe part will be thrown radially outwardly from the side of the globe and away from the joint by the outstanding annulus 9. This manner of joining the globe parts enables conveniently constructing the globe parts in approximately true hemispherical form so that they will form an approximately perfect sphere when joined.

The described waterproof manner of assembling the upper and lower parts of the globe renders the use of gaskets and packings unnecessary and undesirable, a very unusual feature where glass and metal parts are joined, and the screw threads on the lower globe part and in the upper globe part need be only sufficiently accurate and matched to prevent separation and rattling of the parts under ordinary service conditions. Because of the positive exclusion of moisture from the joint with its accompanying corrosion and rust, the globe parts may be separated easily and without such straining of the parts as might damage either one or both of them or causing splitting or breaking of the upper globe should it be made of glass or other frangible material.

Opposite sides of the upper globe part will usually be provided with direction indicating arrows or other symbols which are rendered highly visible when the signal lamp is energized.

Figure 2:
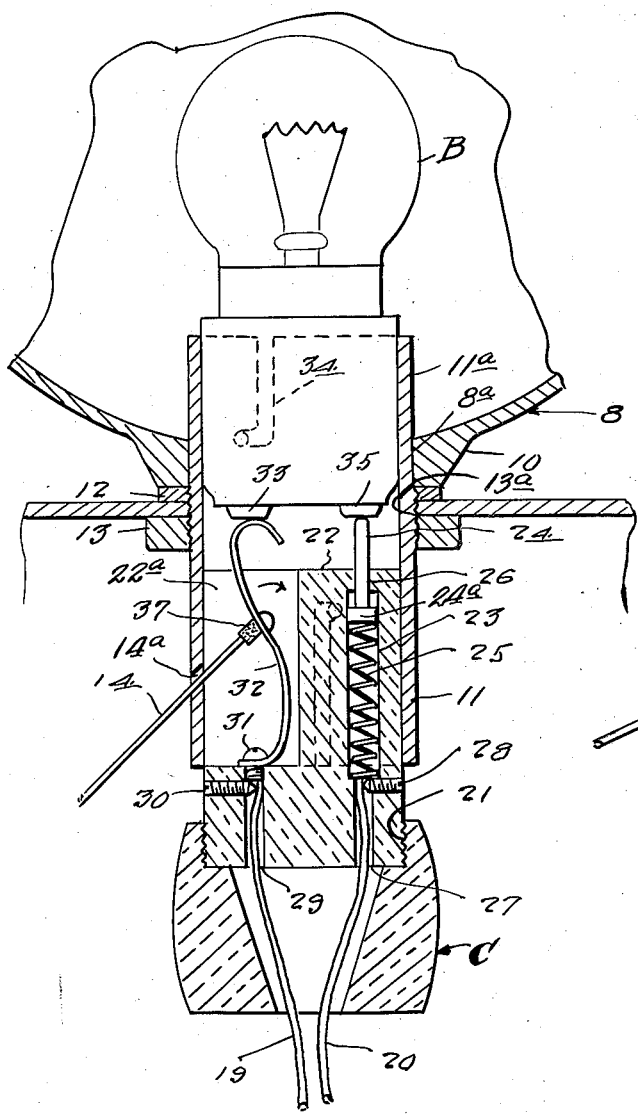
Figure 2 is a transverse vertical sectional view through the lower part of Figure 1 showing interior arrangements thereof.
Figure 3:
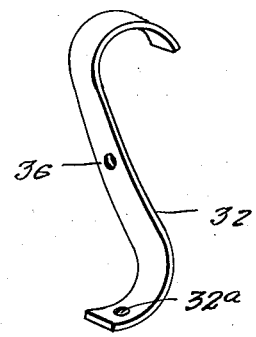
Figure 3 is a perspective view of the spring switch arm.
Figure 4:
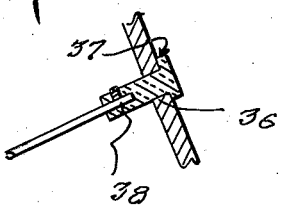
Figure 4 is an enlarged sectional view showing how the operating cable is connected to the spring switch arm.

The preferably metallic lower globe part 8 is provided with an opening 8a which is surrounded by a relatively thick tapering annulus 10 which depends from the bottom thereof as shown in Fig. 2. Into the opening 8a is pressed or otherwise suitably secured the upper portion 11a of the tubular base member 11 so that the upper portion 11a extends upwardly into the interior of the hemisphere 8 for some distance and the remaining portion of the base member depends below the hemisphere 8. The said remaining portion is arranged to be passed downwardly through the hole which is provided in the fender or other sheet metal part (not shown) of the automobile on which the lamp is being installed, until the bottom of the annulus 10 rests upon the top surface of the fender or the like.

Just below the bottom of the annulus 10 the said remaining portion of the tubular base member is exteriorly screw threaded as indicated at 13a to accommodate the clamping nut 13 which is used to forcibly engage the underside of the fender or the like so as to bring the said bottom of the annulus 10 into forcible engagement with the top surface of the fender or the like and thereby solidly secure the lamp in place. A suitable washer or gasket 12 may be interposed between the bottom of the annulus 10 and the top surface of the fender or interposed between the underside of the fender and the clamping nut, as may be desired.

Having a major portion thereof telescoped into and secured in place in the tubular base member 11 from the lower end thereof is the generally cylindrical dielectric body 22 which carries the switch mechanism, for energizing and deenergizing the electric bulb B which is mounted in the portion 11a of the base member which acts as a socket therefor, having the bayonet slot 34 to receive the bayonet common on this type of bulb. As shown in Figure 2 the upper end of the dielectric body 22 is spaced from the lower end of the base of the bulb B.

The top and one side of the dielectric body is cut away to provide the recess 22a in which works the spring switch arm 32. The spring switch arm 32 is S-shaped and is held in normally erect position by a screw 31 which passes through an opening 32a provided in the lower hook of the arm and threads into the upper end of a passage 29 whose upper end opens through the floor of the recess 22a. The lower end of the passage 29 opens through the lower end of the dielectric body 22. The spring switch arm 32 has tension tending to move its head toward engagement with the bulb base contact 33 when pull on the operating cable 14 is released.

At the side of the dielectric body 22 opposite the recess 22a is a bore 23 which has an upper reduced portion 26 and a lower reduced portion 27. Within the bore 23 is a plunger contact which has a portion 24 slidable in the reduced bore portion 26 for engaging the remaining bulb base contact 35. A helical spring 25 confined in the bore 23 works against the head 24a in the lower end of the plunger contact which slides in the bore 23, whereby the plunger contact portion 24 is normally yieldably engaged with the bulb base contact 35. The bore portion 27 opens through the lower end of the dielectric body 22 and forms a passage through which a wire 20 passes to contact with the spring 25. A set screw 28 traverses the side of the dielectric body and enters the bore portion 27 to clamp the wire 20 in engagement with the lower end of the spring 25. The passage 29 in the opposite side of the dielectric body performs the same office as the bore portion 27, receiving the wire 19 which is clamped in contact with the screw 31 by the set screw 30.

The lower end of the exposed part of the dielectric body is exteriorly screw threaded as indicated at 21 to accommodate a knurled tubular wire protecting knob C of conventional type.

One end of the operating cable 14 is connected to a movable member of the steering gear of the automobile by means of a suitable form of clamp such as that designated 17 in Figure 1. The opposite end of the cable 14 passes through a hole 14a in the side of the tubular base member 11 and is connected to the middle of the spring switch arm 32 by a headed plug 37 of dielectric material. The terminal of the cable is inserted in an axial opening in the plain end of the plug 37 wherein it is anchored by a set screw 38. The plug 37 is located in a hole 36 at the middle of the spring switch arm 32 with the head of the plug engaging the side of the switch arm opposite that at which the cable 14 is located. It is obvious that the lower end of the cable 14 will be connected to a member of the steering gear in such a manner that while the steering gear is in the straight ahead position the spring switch arm 32 will be held away from the bulb base contact 33 by the cable 14; and that while the steering gear is turned to one side, the cable 14 will be relaxed so that the spring switch arm 32 is permitted to spring into contact with the bulb base contact 33 and thereby light the bulb B whereby the direction symbol on the globe is illuminated and displayed to warn motorists and pedestrians of the intentions of the operator of the automobile. Should the steering gear be turned to the opposite side, the spring switch arm 32 will simply be flexed and separated from the bulb base contact 33 as described, the travel of cable 14 beyond the position it occupies in the straight ahead position of the steering gear being compensated for by the presence of a spring 16 incorporated therein for this purpose, and the lamp will remain dark; while a similar lamp (not shown) which may be similarly provided and arranged on the opposite side of the automobile is in operation to indicate the turn to that side.

Although I have shown and described herein a preferred embodiment of my invention, it is to be definitely understood that I do not desire to limit my invention thereto, and any change or changes may be made in materials and in the structure and arrangement of parts within the spirit of the invention and the scope of the subjoined claim.

Having thus described my invention, what I claim as new is:—

A lamp for mounting on an automobile fender or the like, said lamp comprising a tubular base extending through an opening provided in the fender to receive the same, a globe at one end of the base arranged to abut the fender about the opening therein, clamping means on the base for engaging the reverse side of the fender, the said one end of the base being formed to support a bulb within the globe, and having a bulb therein, switch means for the bulb mounted in the other end of the base, and switch operating means operatively connected to the switch means and extending through an opening provided in the side of the said other end of the base at the reverse side of the fender for connection to an operating member.

ERNEST KOENIG.